Figure 5:
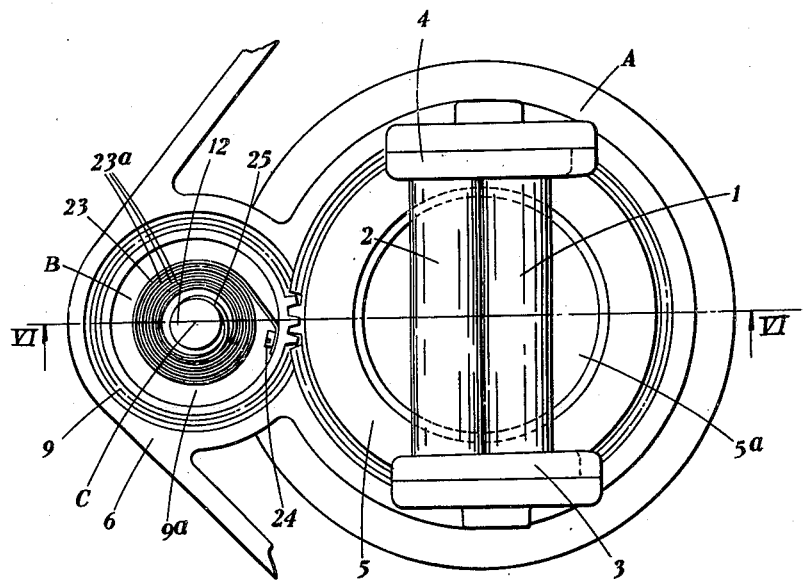

Sept. 7, 1943.     T. C. BROMLEY ET AL     2,329,153
SHAFT COUPLING
Filed Dec. 9, 1940         4 Sheets-Sheet 1
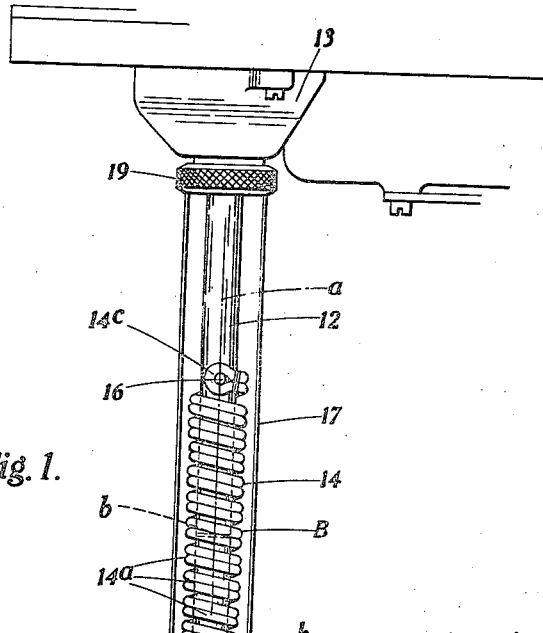
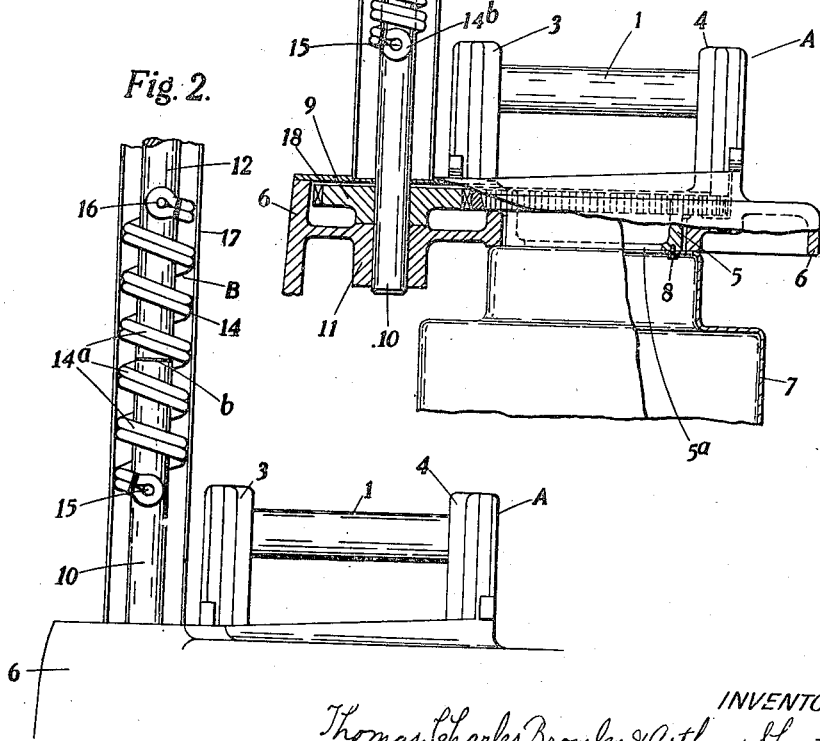

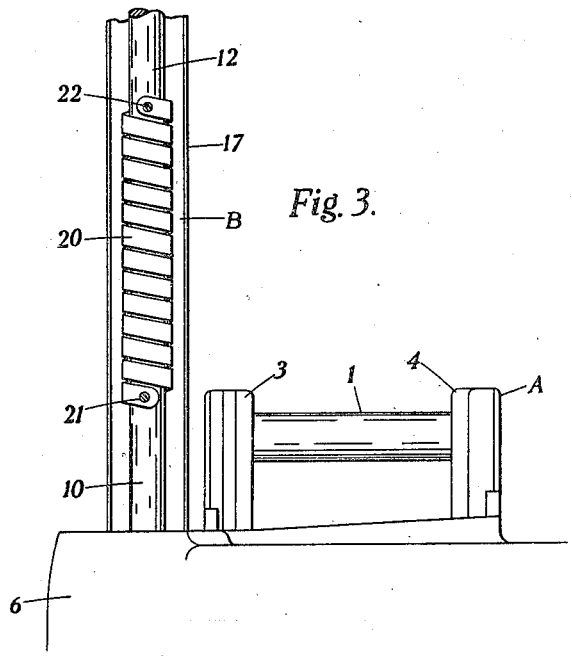
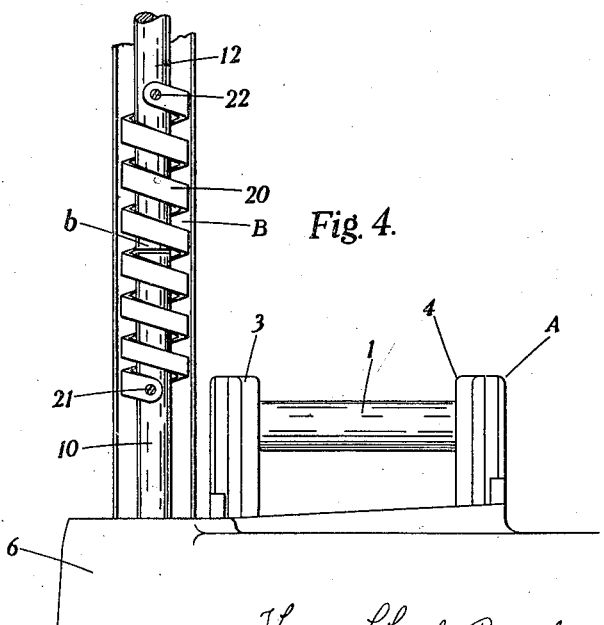

Sept. 7, 1943.    T. C. BROMLEY ET AL    2,329,153
SHAFT COUPLING
Filed Dec. 9, 1940    4 Sheets-Sheet 3

INVENTORS,
Thomas Charles Bromley & Arthur Shortland,
BY
Frank S. Appleman,
ATTORNEY.

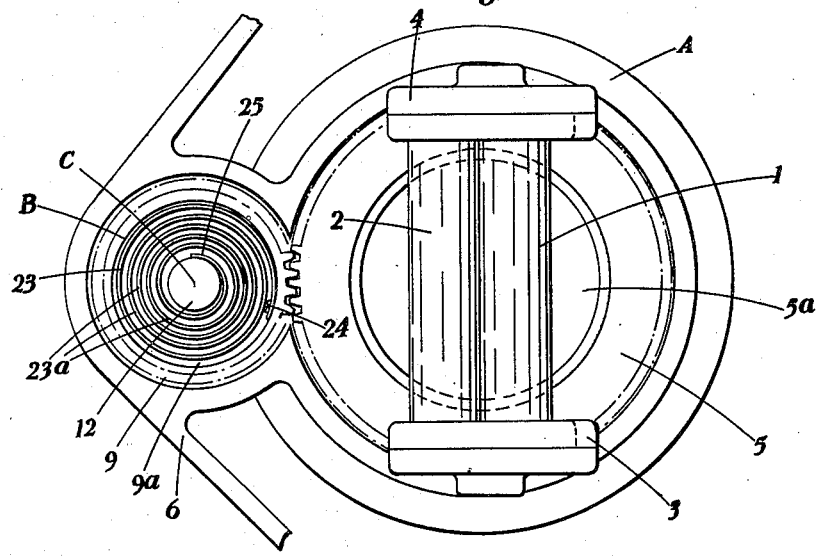
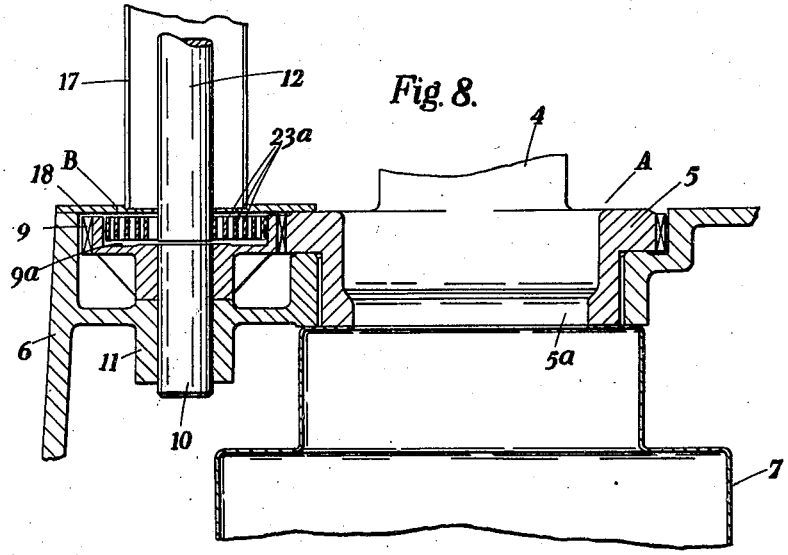

Patented Sept. 7, 1943

2,329,153

UNITED STATES PATENT OFFICE 2,329,153

SHAFT COUPLING

Thomas Charles Bromley and Arthur Shortland, Leicester, England, assignors to Mellor Bromley & Co. Limited, Leicester, England, a British company Application December 9, 1940, Serial No. 369,324
In Great Britain December 4, 1939

1 Claim. (Cl. 64—27)

This invention relates to shaft couplings and has reference more particularly to means adapted to couple together aligned shafts whereby rotary motion is conveyed from one shaft to another.

Although the invention is mainly intended for application to a machine, apparatus or mechanical arrangement wherein one of two co-axial shafts is required at times to have rotary reciprocatory motion in relation to the other, it is not to be regarded as limited in this respect since it is also applicable to cases where both of such shafts are to rotate always in the same direction.

Moreover, although the invention is of general application to any machines, apparatus or arrangements—and more especially to those wherein a rotatable part is required at times to remain stationary while an associated part reciprocates—it is principally the intention to apply it to a circular knitting machine of the rotary needle cylinder type adapted to have rotary and rotary reciprocatory motion at respectively different times. Thus, for instances, the invention may be embodied in a circular knitting machine of this type wherein a rotary part is required to remain stationary at such times as the cylinder head reciprocates. In this respect the invention is eminently suitable and is mainly intended for embodiment in a seamless hosiery machine, in conjunction with the means for driving the unit comprising the fabric winding-down mechanism and the associated work canister or tin, for the purpose of enabling the latter to be revolved bodily in unison with the needle cylinder or cylinders during circular knitting, and to remain stationary at such times as said cylinder or cylinders is or are reciprocated during the production of heel and toe pouches. By the expression "work canister or tin" herein employed in the following further description and in the appended claims is meant, of course, the conventional container (usually of cylindrical form) for reception of the knitted fabric as it is drawn off from the needles of the machine by the aforesaid winding-down mechanism.

Now, in circular knitting machines of the type concerned as heretofore frequently constructed the fabric winding-down frame, together with the work canister or tin, is adapted to be driven in unison with the needle cylinder or cylinders through the medium of clutch mechanism or suitable gearing controlled from a timing drum or chain suchwise that whenever rotary motion of the machine is to be changed to rotary reciprocatory motion the opposed clutch parts or the appropriate gears are disengaged. In this way the drive to the shaft by means of which the winding-down frame and the canister or tin are driven is temporarily interrupted, but to prevent said canister or tin from overrunning owing to the load carried thereby a brake is usually applied thereto. Upon resumption of normal rotary motion of the cylinder or cylinders the clutch parts or the aforesaid gears are re-engaged whereupon the driven shaft takes up the drive and the winding-down frame and associated canister or tin are again rotated. In practice, however, the drive is not taken up smoothly, since upon re-engagement of the clutch parts or the gears snatching or/and clashing usually occurs.

The principal object of the present invention, therefore, is to provide, in a circular knitting machine of the type concerned, in conjunction with the fabric winding-down mechanism, improved drive-transmitting means designed to obviate the disadvantages aforesaid.

Bearing in mind, however, that the invention is also of general application, another object is to provide a shaft coupling of improved form as will be hereinafter described.

To this end two co-axial shafts are coupled together by means of plant material which is adapted to be wound spirally about the axis of the shafts and is of such a nature that it can either be wound up tightly or uncoiled, at least partially.

Thus, where one of the co-axial shafts is intended to drive the other, the idea is that upon the pliant material (of which there is at least one length) being wound up tightly by effecting relative rotation of the shafts in the appropriate direction, the convolutions or coils of said material will bind closely upon the shafts or/and together thereby conveying rotary motion from one shaft to the other, whereas upon the material being unwound, either substantially wholly or only partly so, by relative rotation of the shafts in the reverse direction, relaxation of the appropriate frictional engagement will result in no motion being transmitted.

Assuming, therefore, that the plant material is, say, in a partially unwound condition then upon rotation of the driving shaft said material will be wound up and as the convolutions or coils thereof gradually bind upon the shafts or/and together the drive will be smoothly transmitted from one coil to the other in a progressive manner until finally the drive is taken up noiselessly and substantially without snatch by the driven shaft. As will be appreciated, whenever the pliant material is fully wound up and both shafts are rotating together the coupling is inflexible and, as it were, quite solid so that for as long as rotation of the two shafts is continued, the drive, far from being resilient, will be transmitted positively. In this respect the improved coupling member is distinguished from what is commonly known as a flexible-coupling wherein the spring or the spirally wound steel band permanently maintains its helical form and is practically unyieldable circularly so that it is incapable of being wound up and unwound in the manner aforesaid.

As hereinbefore alluded to, it is within the scope of the invention to apply the improved coupling member to shafts which are to rotate together always in the same direction. Thus, for instance, such a member may be provided for the purpose of enabling the driving shaft to gather momentum before rotation thereof is transmitted to the axially opposed driven shaft. In this way the strain imposed on a motor or other source of power, in starting up, may to some extent be minimised.

An important feature of the invention, however, resides in the adoption of a coupling member of the improved form for connecting together axially opposed shafts which are required at times to be rotated together in the same direction, but the driving shaft of which is adapted at other times to have a rotary reciprocatory motion while the driven shaft remains stationary. In these circumstances the aforesaid pliant material is wound up and transmits the drive during rotary motion, but is merely alternately uncoiled and wound up without transmitting the drive at such times as the driving shaft is reciprocated. So far as the coupling functions in this way it also constitutes what is the equivalent of a clutch the interengaging members of which are the adjacent convolutions or coils of the flexible material.

Some specific examples of the invention embodied in the means for driving the fabric winding-down mechanism of a circular hosiery machine of the rotary needle cylinder type will now be described with reference to the accompanying diagrammatic drawings.

Figure 6:
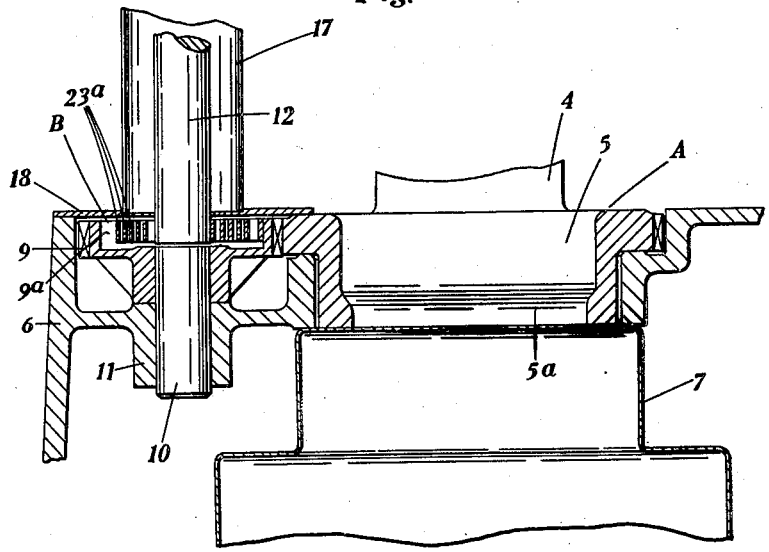

In the drawings,

Figure 1 is an elevational view, partly in section, of so much of said winding-down mechanism as is necessary to illustrate the employment in conjunction therewith of one form of the improved drive-transmitting means, Figure 2 is a fragmentary view of the said means showing the coupling member in a partially unwound condition so that no motion is transmitted to the winding-down mechanism, Figures 3 and 4 are two views showing an alternative form of the improved coupling member as it appears when fully wound up and in an unwound condition respectively, Figure 5 is a general plan view of the winding-down mechanism illustrating the provision in conjunction therewith of a still further form of the coupling member as it appears when fully wound up, Figure 6 is a vertical sectional view thereof taken on the line VI—VI of Figure 5, and Figures 7 and 8 are two views similar to Figures 5 and 6 respectively but showing the coupling member in an unwound condition.

Like parts are designated by similar reference characters throughout the drawings.

In the drawings the fabric winding-down mechanism is indicated at A and comprises two fabric gripping rollers 1 and 2 which are rotatably mounted side by side, as shown in Figures 5 and 7, in a pair of upstanding brackets 3 and 4. These brackets constitute bearings for the rollers and are carried by a gear wheel 5 which latter is mounted to rotate upon a stationary support 6. This support is rigidly secured to the frame of the circular hosiery knitting machine (not shown). A work canister or tin 7 is attached to the underside of the gear wheel 5 by means of screws or bolts such as 8 (Figure 1). The upper portion only of the canister or tin 7 is shown—in each of Figures 1, 6 and 8. The gear wheel 5 is arranged to mesh with a pinion 9 which is in turn adapted to be driven from the needle cylinder or cylinders of the machine. In this connection the said pinion is secured to a vertically disposed shaft 10 the lower end of which is rotatably mounted in a bearing 11 formed in the support 6. The shaft 10 is driven from an axially opposed driving shaft 12 which latter derives its rotary motion from the cylinder or cylinders through the medium of spur, bevel or any other suitable form of gearing. For example, a pinion secured to the upper end of the shaft 12 may mesh with the customary cylinder-driving gear. A casing for the accommodation of this gearing is indicated at 13 in Figure 1. In each of the examples shown, a couling B of pliant material is provided for transmitting the drive from the driving shaft 12 to the co-axial driven shaft 10 at appropriate times as will be hereinafter more fully described. The arrangement is such that during circular knitting the winding-down mechanism, including the canister or tin 7, revolves bodily in unison with the needle cylinder or cylinders of the knitting machine. At such times as said cylinder or cylinders is or are reciprocated, however, the winding-down mechanism remains quiescent. The gear wheel 5 has formed therein a central hole or opening 5a through which fabric passes into the canister or tin 7 as it is drawn off from the needles.

In the example of the invention illustrated in Figures 1 and 2, the coupling member B serving to couple together the co-axial shafts 10 and 12 consists of an endless belt, band, cord or the like such as 14 of pliant material which, in a closed condition, is wound or coiled about the opposed end portions of the shafts in the manner shown suchwise that the convolutions or coils 14a advance progressively along the axis a of said shafts. The endless belt, band, cord or the like is in a flattened straightened or closed condition, i. e., with its opposite sides brought together so as to form a member of double form with an integral loop at each end. Accordingly by the expression "an endless belt, band, cord or the like in a closed condition" used in the appended claims is meant a member of this form. The integral loops 14b and 14c are engaged with pins 15 and 16 projecting laterally from the driven and driving shafts 10 and 12 respectively. The general formation of the coils 14a of the coupling member are somewhat similar to those of a compression spring, and a member of this particular form is the equivalent of a comparatively stout single length of pliant material having a loop at each end to facilitate its attachment to the opposed shafts. A cylindrical cover 17 is mounted concentrically with respect to the shafts 10 and 12 and is arranged to surround the coiled coupling member B for the purpose of preventing the coils 14a thereof from collapsing (for instance by reason of them overlapping), more particularly at such times as said member is being uncoiled. This cover 17, which is longer than the coupling member B and of somewhat larger diameter than the latter in its wound up condition, is supported at its lower end within a recessed portion of a plate 18 attached to the top of the support 6. At its upper end the said cover is secured in position beneath the gear casing 13 by means of a milled nut 19

(see Figure 1). If desired, the cylindrical cover 17 may be divided longitudinally into front and back halves to facilitate assembly and removal. In the drawings the front half of the cover is removed for convenience in illustration. While the coupling member is being uncoiled the convolutions or coils 14a thereof gradually open out and make contact with the internal wall of the cylindrical cover 17 which latter thereupon functions by reason of this contact to exercise some constraint or control upon said convolutions or coils. The opposed ends of the shafts 10 and 12 are slightly separated at b to ensure that they do not make contact.

In the example shown in Figures 3 and 4, the coupling member B consists of a single length of flat belting 20 which is coiled about the opposed end portions of the shafts and secured at one end to the driven shaft 10 by means of a screw 21 and at its opposite end to the driving shaft 12 by means of a screw 22. A single strip or length of any suitable pliant material other than flat belting may, of course, be used in this example.

Referring now to the still further embodiment of the invention depicted in Figures 5 to 8, the coupling member B consists of a length 23 of pliant material of flat form in cross section which is wound about a fixed point c, viz. the centre of the shaft 12, suchwise that the convolutions or coils 23a gradually increase in diameter and the coupling member lies in one plane like a watch spring. In this embodiment the coupling member is accommodated within a circular recess 9a formed in the top of the pinion 9. The internal wall of this recess surrounds the coiled coupling member B and the diameter thereof is somewhat in excess of the diameter of the outermost convolution or coil of said member when the latter is in the unwound condition represented in Figures 7 and 8. As shown in Figures 5 and 7 one end of the coupling member is attached at 24 to the pinion 9 which latter is, of course, fast on the driven shaft 10, while the other end is attached at 25 to the driving shaft 12. To enable the coiled coupling member to be clearly seen in each of Figures 5 and 7, the cylindrical cover 17 and the plate 18 have been omitted from the latter.

In the foregoing examples the coupling member B may be made of any suitable pliant material. For instance, either wire rope or cotton rope may be employed for the intended purpose. Alternatively, leather of circular, flat or any other suitable cross-sectional shape may be used, or the coupling member may even consist of a closely coiled pliant wire or the like capable of being readily wound up and uncoiled in the manner required. Rope or the equivalent having a covering of rubber—however applied— may also be employed. Again the material, irrespectively as to whether it is in a single length or in the form of an endless belt, band or cord, may either be inextensible or capable of longitudinal stretch. In this latter respect elastic cord may be adopted. Material comprising a rubber core with a textile covering is also suitable. Moreover, a coupling member consisting of an elastic endless band which is formed of a multiplicity of threads constituting a core having an outer covering or binding of threads braided on or similarly applied may, if desired, be used.

The construction is such in each of the examples described that whenever the cylinder ar cylinders is or are reciprocating, the shaft 12 driven therefrom is alternately rotated first in one and then in the opposite direction so that the associated coupling member B is merely alternately uncoiled and wound up without transmitting the drive to the opposed shaft 10 whereby the fabric winding-down mechanism, including the work canister or tin 7, remains stationary. Upon resumption of rotary knitting, however, the coupling member B is wound up so that in the result the winding-down from and work canister or tin is driven in unison with the cylinder or cylinders. The driving shaft 12 may be turned through, say, four complete revolutions—two in one direction and then two in the opposite direction—at each reciprocation of the needle cylinder or cylinders during reciprocatory knitting. The work canister or tin 7 may or may not have in association therewith a brake adapted to be applied thereto during reciprocatory knitting.

As an alternative to the cylindrical cover 17 hereinbefore described there may be provided for the same purpose a similarly arranged tube which is supported at its opposite ends by collars mounted upon the shafts 10 and 12. The collars are suitably spaced apart, one of them being rigidly secured to one of the shafts, e. g. by means of one or more screws, and the other being free upon the opposed shaft. The tube may be attached to or supported upon the collars by any suitable means or in any suitable manner, and if desired said collars may be formed with flanges adapted to bear upon or engage the opposite ends of the tube. The opposed ends of the shafts 10 and 12 may, if desired, be separated somewhat in which instance a comparatively short tube or a similar covering may be applied to the shafts suchwise as to cover the space between the said opposed ends thereby preventing the coils of the coupling member from entering or/and becoming trapped between them; if provided, such a tube or covering must, of course, be of such a character or/and be so applied as freely to permit of relative rotation of the shafts. For example, a flexible tube, e. g. of rubber, may be placed over the ends of the shafts, this tube being capable of being twisted upon relative rotation of the shafts. For the same purpose, a coiled steel strip with overlapping coils may be applied to the opposed ends of the shafts so as in effect to provide a collapsible tube. Or the tube may be a solid one in which instance it would be rigidly secured to the end of one of the shafts and be free upon the end of the opposed shaft.

What we claim then is:

Mechanism including a driving shaft adapted to have continuous rotary motion and rotary reciprocatory motion at respectively different times, another shaft disposed in end to end relation with respect to said driving shaft, a coupling for the shafts comprising a pliable and substantially non-resilient element having one of its ends secured to each of said shafts coiled about the axis of said shafts, said element being adapted to be wound up tightly so as to transmit rotary motion from the driving shaft to the opposed shaft at such times as the driving shaft is rotated continuously but capable of freely unwinding so that it will alternately be wound up and uncoiled without transmitting the drive whenever said driving shaft has rotary reciprocatory motion imparted to it.

THOMAS CHARLES BROMLEY.
ARTHUR SHORTLAND.